United States Patent
Ivey

(10) Patent No.: US 10,334,338 B2
(45) Date of Patent: Jun. 25, 2019

(54) ADJUSTABLE SPEAKER SUPPORT FOR SUSPENDED CEILINGS

(71) Applicant: Mitek Corp., Inc., Phoenix, AZ (US)

(72) Inventor: Johnathan Ivey, Chandler, AZ (US)

(*) Notice: Subject to any disclaimer, the term of this patent is extended or adjusted under 35 U.S.C. 154(b) by 0 days.

(21) Appl. No.: 16/038,495

(22) Filed: Jul. 18, 2018

(65) Prior Publication Data

US 2019/0090041 A1 Mar. 21, 2019

Related U.S. Application Data

(63) Continuation-in-part of application No. 15/710,654, filed on Sep. 20, 2017.

(51) Int. Cl.
*H04R 1/02* (2006.01)
*F16M 13/02* (2006.01)

(52) U.S. Cl.
CPC .......... *H04R 1/026* (2013.01); *F16M 13/027* (2013.01); *H04R 1/025* (2013.01); *F16M 2200/027* (2013.01)

(58) Field of Classification Search
CPC ....................................................... H04R 1/02
See application file for complete search history.

(56) References Cited

U.S. PATENT DOCUMENTS

| | | | | |
|---|---|---|---|---|
| 3,313,931 A * | 4/1967 | Klugman | ............... | F21V 21/04 362/364 |
| 4,923,032 A | 5/1990 | Nuernberger | | |
| 4,927,128 A * | 5/1990 | O'Brian | .................. | A47B 3/087 108/36 |
| 5,690,423 A * | 11/1997 | Hentz | ....................... | F21S 8/02 248/302 |
| 5,957,573 A * | 9/1999 | Wedekind | ............... | F21V 21/04 362/147 |
| 6,161,336 A * | 12/2000 | Ziv-Av | ..................... | E05D 15/48 49/260 |
| 6,164,408 A | 12/2000 | Lamm et al. | | |
| 7,355,118 B1 * | 4/2008 | Gretz | ..................... | H02G 3/125 174/50 |
| 7,521,631 B2 * | 4/2009 | Dinh | ...................... | H02G 3/125 174/480 |
| 7,786,379 B1 * | 8/2010 | Kwong | ................... | F21V 21/03 174/50 |

(Continued)

*Primary Examiner* — Olisa Anwah
(74) *Attorney, Agent, or Firm* — Keith L. Jenkins, Registered Patent Attorney LLC; Keith L. Jenkins

(57) ABSTRACT

A small dual-speaker ceiling speaker system including a loudspeaker and a tweeter with an acoustic diffuser that is adjustable over a range of lengths for different thicknesses of ceiling tile and is independently adjustable over a range of acoustic port sizes. The loudspeaker sends acoustic waves into a acoustic channel that includes a truncated conical shell, or acoustic channel cone, with a cylindrical acoustic channel shell extending therefrom. A tweeter is mounted in the acoustic channel shell. A diffuser couples to the acoustic channel shell using threads that may be engaged or disengaged. The diffuser has a diffuser element that can be raised or lowered with a screw to adjust the size of the acoustic port. The diffuser element has demarcations for visually indicating acoustic port size. A housing with a base having extendable braces supports the speaker system on the ceiling grid, rather than on the tile.

20 Claims, 8 Drawing Sheets

(56) References Cited

U.S. PATENT DOCUMENTS

| | | | | |
|---|---|---|---|---|
| 8,038,113 B2* | 10/2011 | Fryzek | ................... | F21S 8/026 248/343 |
| 8,444,302 B1* | 5/2013 | Barboza | ................... | F21S 8/02 362/269 |
| 2004/0005073 A1* | 1/2004 | Liu | ....................... | H04R 1/026 381/395 |
| 2004/0159490 A1* | 8/2004 | Marlin | .................... | H04R 9/02 181/148 |
| 2006/0231326 A1* | 10/2006 | Iwayama | ............... | H04R 1/025 181/150 |
| 2007/0283657 A1* | 12/2007 | Pratt | ....................... | E04B 9/067 52/506.08 |
| 2010/0270446 A1* | 10/2010 | Phillips | ................ | H05K 5/0204 248/201 |
| 2011/0123258 A1 | 5/2011 | Braun et al. | | |
| 2011/0188250 A1* | 8/2011 | Waldhuetter | .............. | F21S 4/26 362/249.05 |
| 2011/0226919 A1 | 9/2011 | Fryzek et al. | | |
| 2013/0020920 A1* | 1/2013 | Weber | .................. | A47B 67/005 312/334.1 |
| 2013/0205702 A1* | 8/2013 | D'Alessandro | ......... | E04B 9/183 52/506.08 |
| 2014/0299730 A1* | 10/2014 | Green | .................. | F16M 13/022 248/317 |
| 2015/0260385 A1* | 9/2015 | Brynjolfsson | ........ | F21V 23/045 315/152 |
| 2017/0044767 A1* | 2/2017 | Gloftis | ................... | E04B 9/183 |
| 2017/0210256 A1* | 7/2017 | Kondrad | ................ | B60N 2/879 |
| 2017/0292269 A1* | 10/2017 | Tornqvist | ................ | E04B 9/064 |
| 2018/0202634 A1* | 7/2018 | Farzan | ................. | F21V 23/009 |

* cited by examiner

US 10,334,338 B2

ADJUSTABLE SPEAKER SUPPORT FOR SUSPENDED CEILINGS

RELATIONSHIP TO OTHER APPLICATIONS

This application is a continuation in part of U.S. patent application Ser. No. 15/710,654 filed 20 Sep. 2017 to the same inventor.

FIELD OF ART

The present invention relates to an enclosure for ceiling mounted loudspeakers. The present invention more particularly relates to a speaker enclosure system that braces directly on the ceiling tile support grid, rather than on the ceiling tile itself.

BACKGROUND OF THE INVENTION

Ceiling speakers are used in suspended ceilings, typically for public address, alarm, or musical entertainment purposes. Conventional ceiling speakers are designed to rest directly on a ceiling tile, which can cause deformation or failure of the tile over time.

SUMMARY OF THE INVENTION

Briefly described, the invention includes an enclosure that includes a rail support panel that supports a plurality of rail guides and a circular opening for a speaker assembly. Rails are received within the rail guides and are extendable against friction to fit various sizes of ceiling grid spacing. The rails support, pairwise, braces that rest on the ceiling grid. A cover is attached to the top of the rail support panel and a bottom panel is attached to the bottom of the rail support panel. The cover includes a recessed compartment with audio wire connectors and a transformer tap selector. The cover also has a cable strain relief near the recessed compartment.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 4:
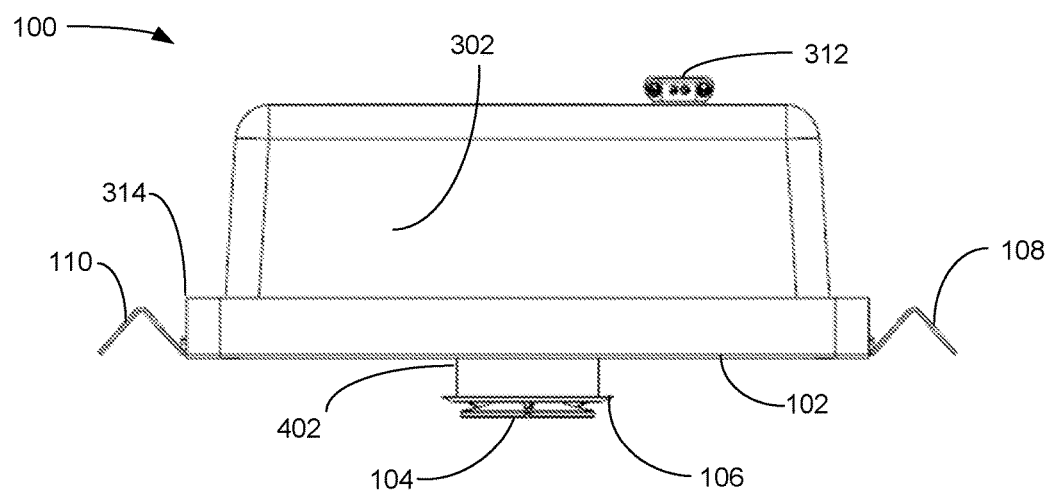
FIG. 4 is a side elevation view illustrating the exemplary embodiment of the adjustable speaker support for suspended ceilings of FIG. 1 in a retracted state, according to a preferred embodiment of the present invention.
Figure 9:
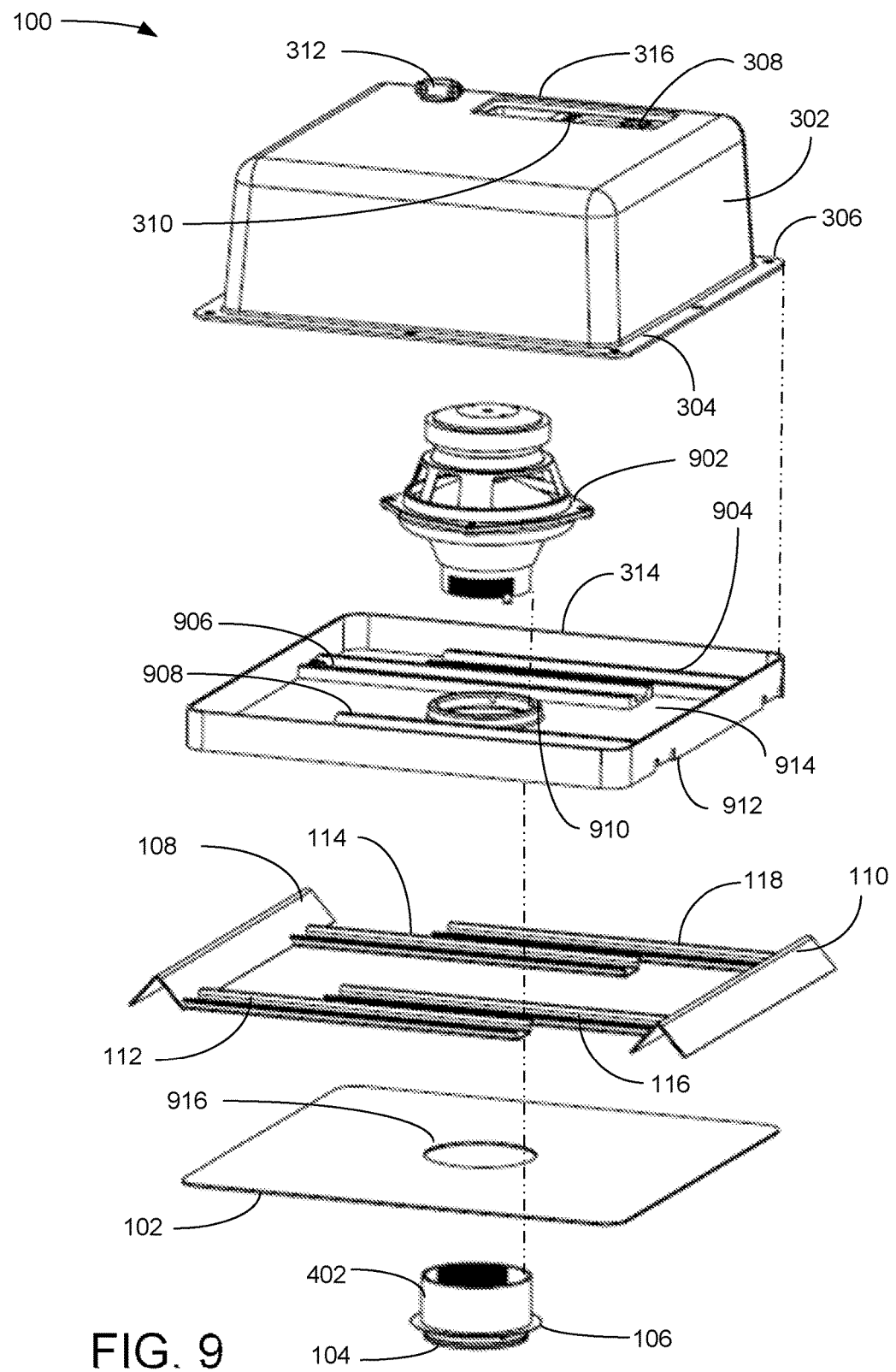
FIG. 9 is a side exploded perspective view illustrating the exemplary embodiment of the adjustable speaker support for suspended ceilings of FIG. 1, according to a preferred embodiment of the present invention.

As used and defined herein, "top", "bottom", "upper", "lower", "upward", and "downward" are referenced to the present invention in its installed orientation, as illustrated in FIG. 4. As used and defined herein, "speaker" means "loudspeaker" or "tweeter", as shown in FIG. 9.

Figure 1:
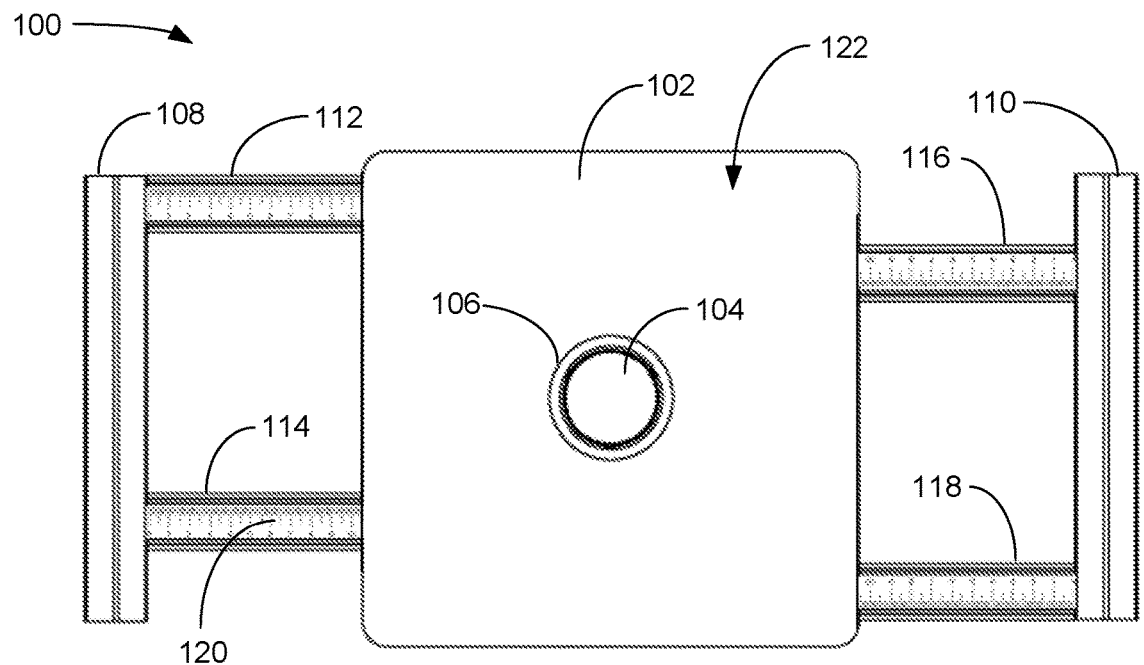
FIG. 1 is a bottom plan view illustrating an exemplary embodiment of the adjustable speaker support for suspended ceilings in an extended state, according to a preferred embodiment of the present invention.

FIG. 1 is a bottom plan view illustrating an exemplary embodiment of the adjustable speaker support for suspended ceilings 100 in an extended state, according to a preferred embodiment of the present invention. The adjustable speaker support for suspended ceilings 100 includes a bottom panel 102 having an opening 916 (see FIG. 9) for receiving an extension of a speaker assembly 902 (see FIG. 9), such as a sound diffuser with rim 106 and cover plate 104. Braces 108 and 110 are designed to rest on respective opposing ceiling support grid members to support the weight of the adjustable speaker support for suspended ceilings 100 without loading the ceiling tile itself. Brace 108 is fixed to extended extendable rails 112 and 114 which extend or retract into the rail guide support panel 914 (see FIG. 9). Similarly, brace 110 is fixed to extended extendable rails 116 and 118. Each extendable rail 112, 114, 116, and 118 may have length graduations 120 to assist in preparation for installations involving a large number of adjustable speaker supports for suspended ceilings 100, once the spacing for the ceiling tile grid members has been established. The bottom surface 122 of bottom panel 102 is illustrated as plain, as it will abut the top surface of a ceiling tile, when installed.

While the illustrated embodiment is for a small speaker assembly, the size of the speaker assembly 902 (see FIG. 9) is not a limitation of the invention. In particular embodiments, more than four extendable rails 112, 114, 116, and 118 may be used. In a particular embodiment, a larger sound diffuser rim 106 may extend through a larger opening 916 to mount flush with the bottom surface of a ceiling tile and may bear a decorative design.

Figure 2:
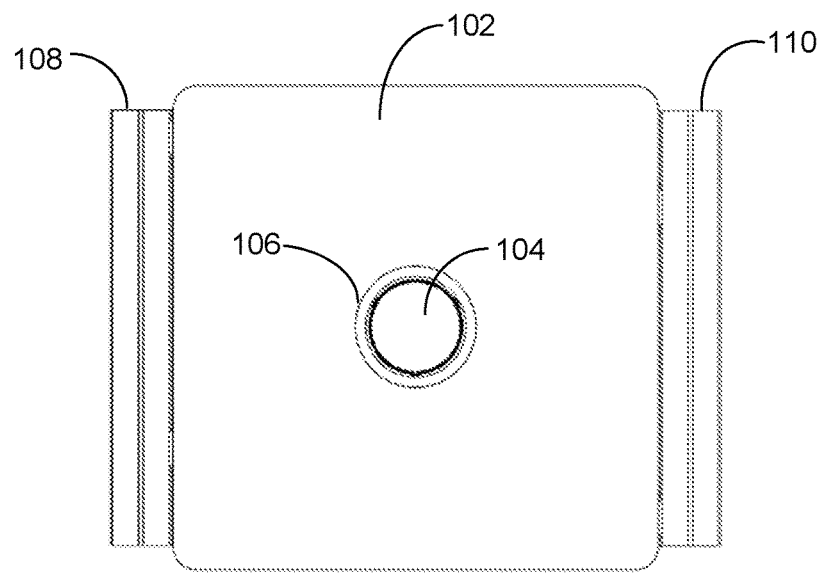
FIG. 2 is a bottom perspective view illustrating an exemplary embodiment of the adjustable speaker support for suspended ceilings of FIG. 1 in a retracted state, according to a preferred embodiment of the present invention.

FIG. 2 is a bottom perspective view illustrating an exemplary embodiment of the adjustable speaker support for suspended ceilings 100 of FIG. 1 in a retracted state, according to a preferred embodiment of the present invention. Retracting the extendable rails 112, 114, 116, and 118 is preferred for shipping and storage, and may correspond to a particular ceiling tile grid member spacing.

Figure 3:
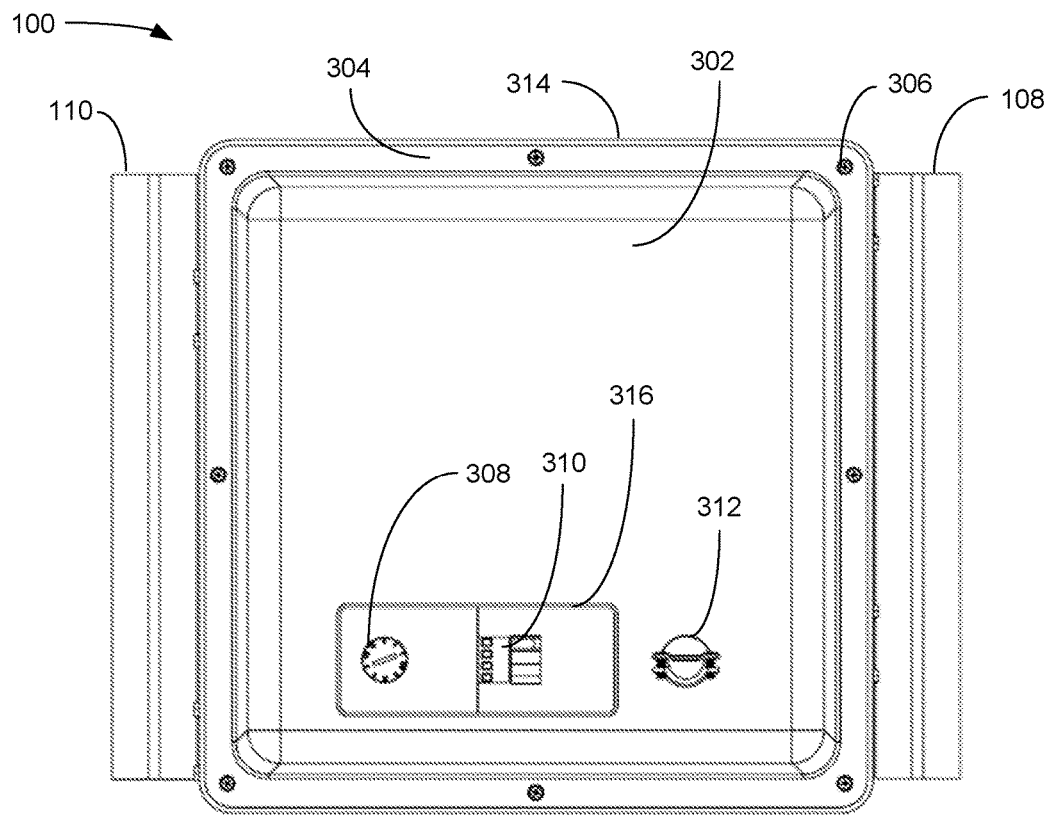
FIG. 3 is a top plan view illustrating the exemplary embodiment of the adjustable speaker support for suspended ceilings of FIG. 1 in a retracted state, according to a preferred embodiment of the present invention.

FIG. 3 is a top plan view illustrating the exemplary embodiment of the adjustable speaker support for suspended ceilings 100 of FIG. 1 in a retracted state, according to a preferred embodiment of the present invention. Enclosure cover 302 has a top panel with a recessed compartment 316. Connectors 310 for audio wires and a transformer tap selection switch 308 are accessed within the recessed compartment 316. Enclosure cover 302 has four walls (see FIG. 4) descending from the top panel to a perimeter flange 304 having fastener openings 306 and fasteners (one of eight labeled). Perimeter flange 304 fits within the rail support panel rim 314. The placement of the recessed compartment 316 and the cable strain relief 312 are preferably chosen to correspond to the placement of the transformer and the orientation of the audio wire connections to the speaker, but may, in other embodiments, be in various positions on enclosure cover 302.

FIG. 4 is a side elevation view illustrating the exemplary embodiment of the adjustable speaker support for suspended ceilings 100 of FIG. 1 in a retracted state, according to a preferred embodiment of the present invention. Sound diffuser barrel 402 can be seen and is extendable adaptive to the thickness of the ceiling tile, such that the ceiling tile is between sound diffuser rim 106 and bottom panel 102. The cross-sectional shape of the braces 108 and 110 and the height of the rail support panel rim 314 can be seen in this view.

Figure 5:
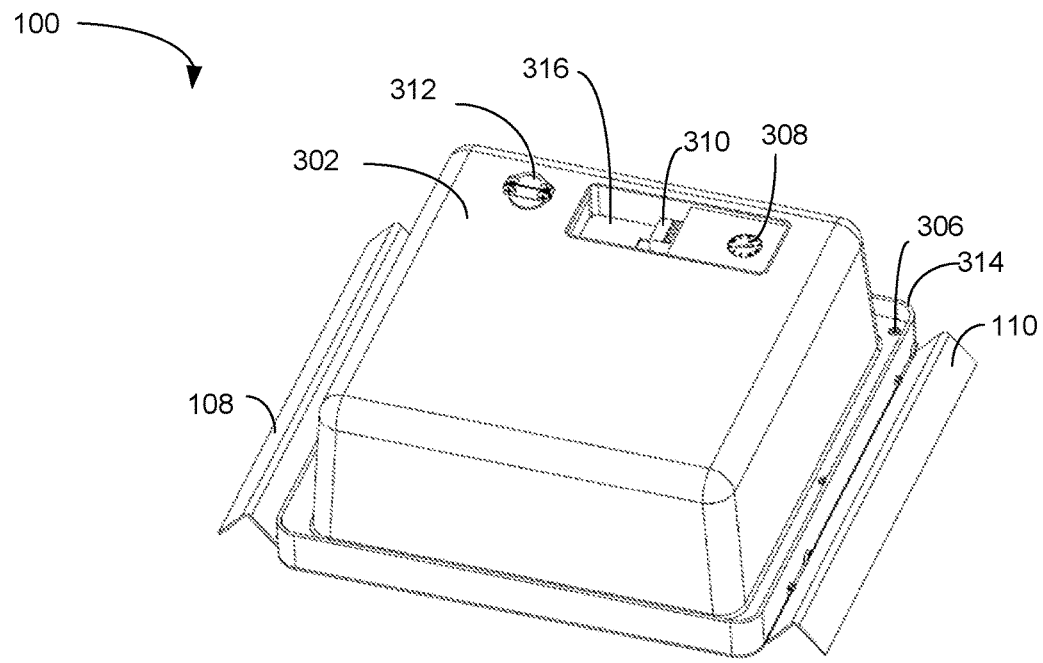
FIG. 5 is a top-side perspective view illustrating the exemplary embodiment of the adjustable speaker support for suspended ceilings of FIG. 1 in a retracted state, according to a preferred embodiment of the present invention.

FIG. 5 is a top-side perspective view illustrating the exemplary embodiment of the adjustable speaker support for suspended ceilings 100 of FIG. 1 in a retracted state, according to a preferred embodiment of the present invention. The depths of the recessed compartment 316 can be seen in this view.

Figure 6:
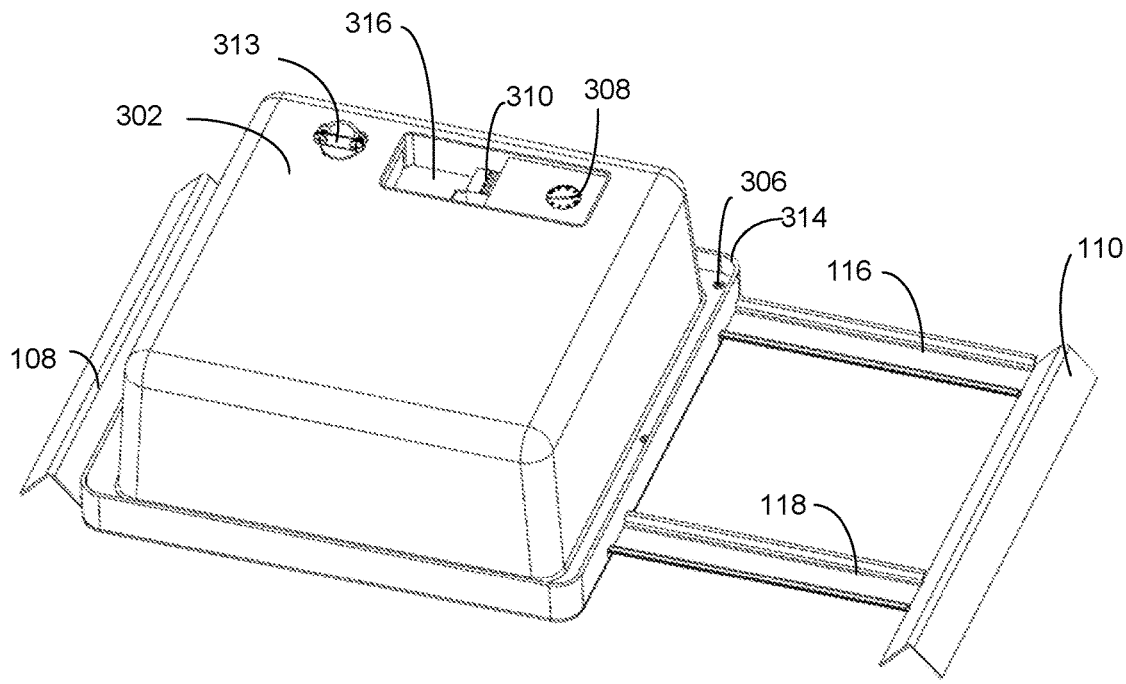
FIG. 6 is a top-side perspective view illustrating the exemplary embodiment of the adjustable speaker support for suspended ceilings of FIG. 1 with one brace extended, according to a preferred embodiment of the present invention.

FIG. 6 is a top-side perspective view illustrating the exemplary embodiment of the adjustable speaker support for suspended ceilings 100 of FIG. 1 with one brace 110 extended, according to a preferred embodiment of the present invention. Extendable rails 116 and 118 are fully extended to illustrate one possible installation configuration. Extendable rails 116 and 118 extend independently of extendable rails 112 and 114, but are not independent of each other.

Figure 7:
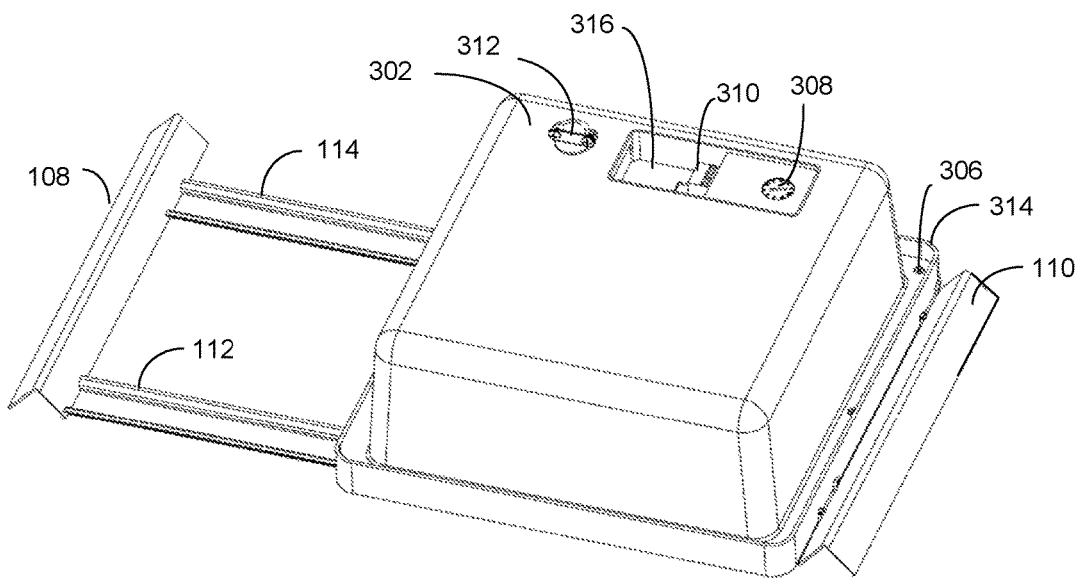
FIG. 7 is a top-side perspective view illustrating the exemplary embodiment of the adjustable speaker support for suspended ceilings of FIG. 1 with one brace extended, according to a preferred embodiment of the present invention.

FIG. 7 is a top-side perspective view illustrating the exemplary embodiment of the adjustable speaker support for suspended ceilings 100 of FIG. 1 with one brace 108 extended, according to a preferred embodiment of the present invention. Extendable rails 112 and 114 are fully extended to illustrate a second possible installation configuration. Extendable rails 112 and 114 extend independently of extendable rails 116 and 118, but are not independent of each other.

Figure 8:
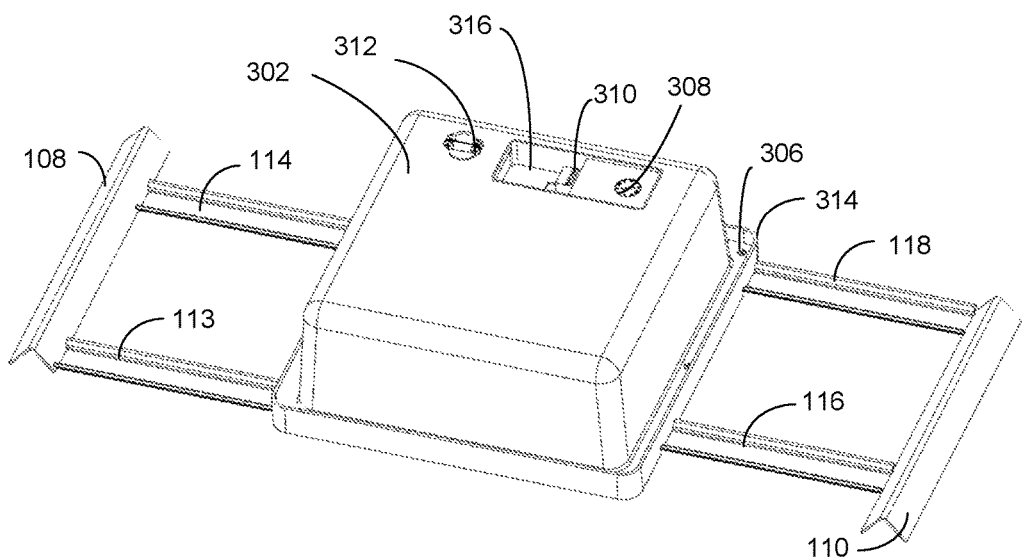
FIG. 8 is a top-side perspective view illustrating the exemplary embodiment of the adjustable speaker support for suspended ceilings of FIG. 1 with two braces extended, according to a preferred embodiment of the present invention.

FIG. 8 is a top-side perspective view illustrating the exemplary embodiment of the adjustable speaker support for suspended ceilings 100 of FIG. 1 with two braces 108 and 110 extended, according to a preferred embodiment of the present invention. Extendable rails 112 and 114, and 116 and 118 are fully extended to illustrate a third possible installation configuration. The three installation configurations illustrated in FIGS. 6-8 are not exhaustive. The extension of one brace 108 does not have to be the same as the extension of the other brace 110.

FIG. 9 is a side exploded perspective view illustrating the exemplary embodiment of the adjustable speaker support for suspended ceilings 100 of FIG. 1, according to a preferred embodiment of the present invention. Rail guide support panel 914 has a perimeter rim 314 that has pairs of rail guide openings 912 (one of four visible labeled). Rail guide support panel 914 supports rail guides 904, 906, 908, and 1002 (see FIG. 10), which are shaped channels that slidingly receive correspondingly shaped extendable rails 118, 114, 116, and 112, respectively. Rail guide support panel 914 also supports speaker assembly attachment feature 910, which includes a short cylindrical shell extending upward from rail guide support panel 914, as shown. Enclosure cover 302 attaches to rail guide support panel 914 via fasteners through fastener openings 306 (one of eight labeled), though fastener receiver posts (not shown) in the rail guide support panel 914, to fastener receiver posts (not shown) on the top surface on bottom panel 102.

The illustrated shape and size of the adjustable speaker support for suspended ceilings 100 are not limitations of the invention. For non-limiting examples, the adjustable speaker support for suspended ceilings 100 may be rectangular, oval, circular, polygonal (regular or irregular) or have perimeters that are combinations of curved and straight lines.

Figure 10:
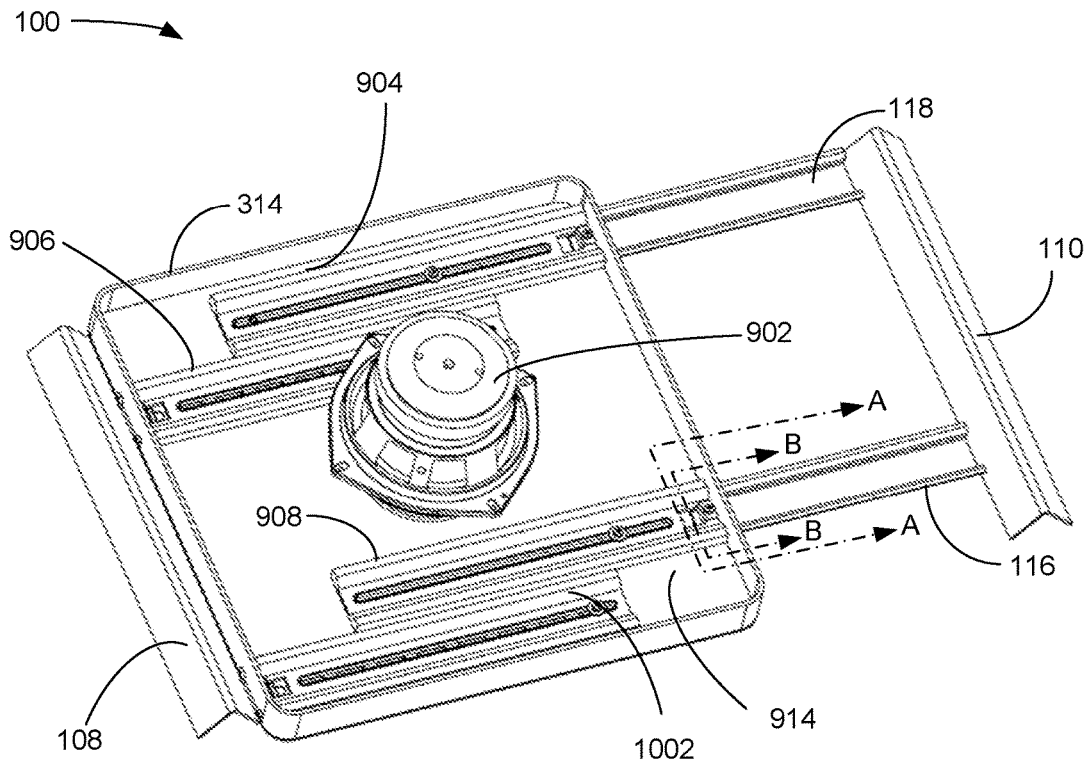
FIG. 10 is a top perspective view illustrating an exemplary embodiment of the rail guide support panel of the adjustable speaker support for suspended ceilings of FIG. 1 and defining cross sections AA and BB, according to a preferred embodiment of the present invention.

FIG. 10 is a top perspective view illustrating an exemplary embodiment of the rail guide support panel 914 of the adjustable speaker support for suspended ceilings 100 of FIG. 1 and defining cross sections AA and BB, according to a preferred embodiment of the present invention. Rail guide 1002 can be seen in this view.

Figure 11:
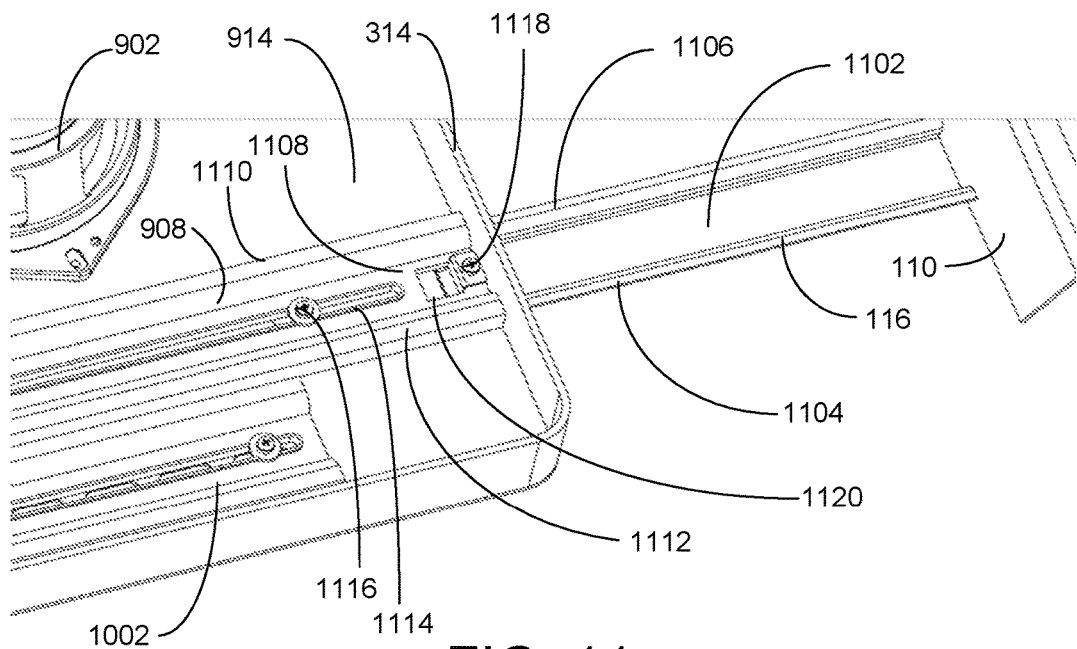
FIG. 11 is a top perspective view illustrating a detail of the exemplary embodiment of the rail guide support panel of the adjustable speaker support for suspended ceilings of FIG. 1, according to a preferred embodiment of the present invention.

FIG. 11 is a top perspective view illustrating a detail of the exemplary embodiment of the rail guide support panel 914 of the adjustable speaker support for suspended ceilings 100 of FIG. 1, according to a preferred embodiment of the present invention. Extendable rail 116 has a flat elongated rectangular central panel 1102, or web 1102, with opposed lateral flanges 1104 and 1106 extending from opposing long sides. Rail guide 908 is correspondingly shaped to receive extendable rail 116. Rail guide 908 has a flat elongated rectangular central web 1108 with opposed upright channels 1110 and 1112 extending from opposing long sides. Central web 1108 has a window 1120 through which a fastened reed spring 1118 extends to frictionally engage the web 1102 of extendable rail 116. This frictional engagement prevents inadvertent sliding of the extendable rail 116 during installation. Central web 1108 also has a slot 1114 that holds a releasable captive fastener 1116 for locking the extendable rail 116 in place. Extendable rail 116 and rail guide 908 are exemplary of extendable rails 112, 114, and 118 and rail guides 1002, 906, and 904, respectively.

Figure 12:
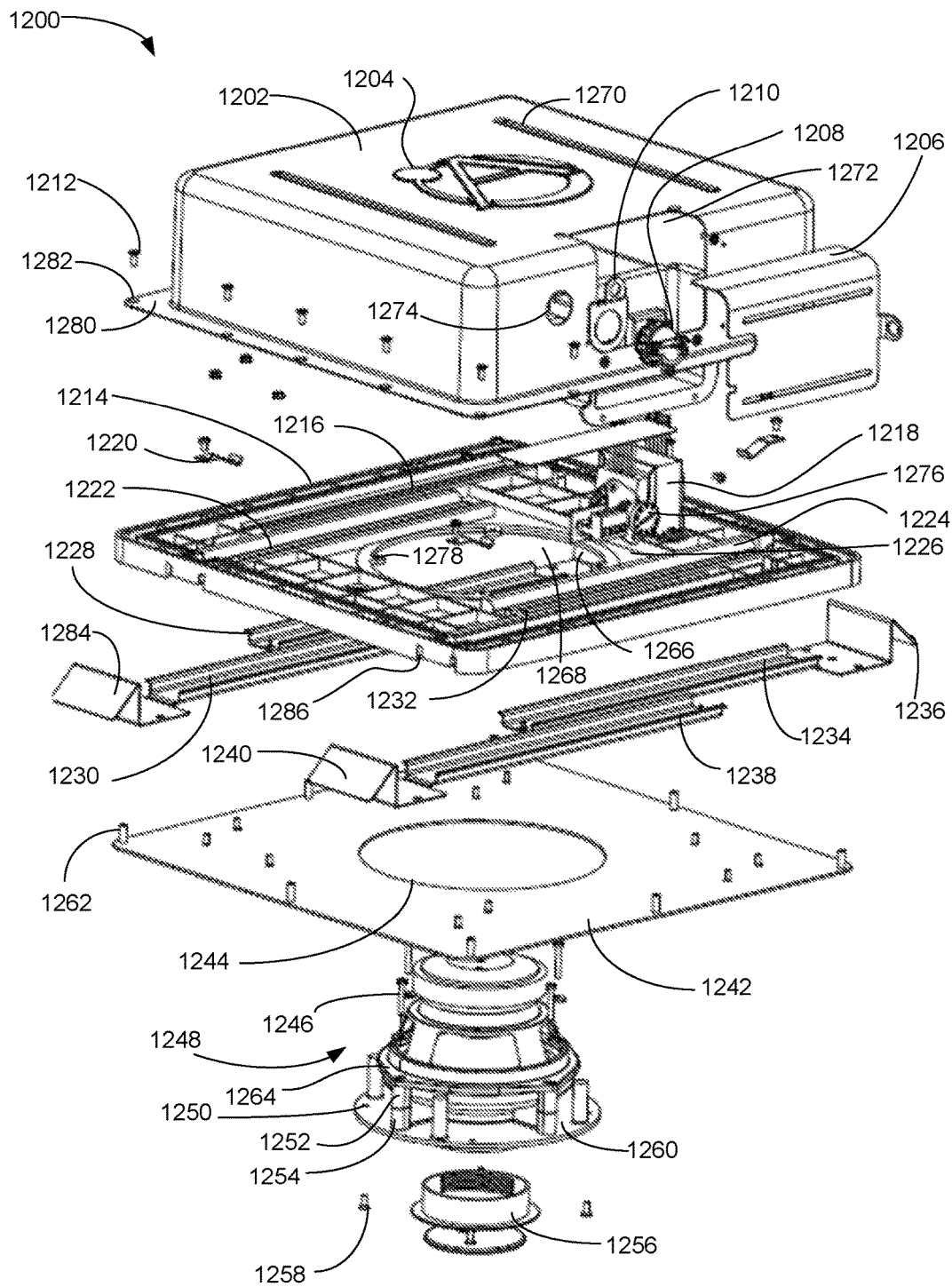
FIG. 12 is a side exploded perspective view illustrating a second exemplary embodiment of an adjustable speaker support for suspended ceilings, according to a preferred embodiment of the present invention.

FIG. 12 is a side exploded perspective view illustrating a second exemplary embodiment of an adjustable speaker support for suspended ceilings 1200, according to a preferred embodiment of the present invention. Adjustable speaker support for suspended ceilings 1200 includes a rail guide support panel 1226 that supports rail guides 1216, 1222, 1224, and 1232, as well as multi-tapped transformer 1218. Rail guides 1216, 1222, 1224, and 1232 slidingly receive extendable rails 1228, 1230, 1234, and 1238 and frictionally engage extendable rails 1228, 1230, 1234, and 1238, respectively, using fastened reed springs 1220 (one of three visible labeled), as with the previously illustrated embodiment. Extendable rails 1230, 1234, and 1238 have individual braces 1266, 1284, 1236, and 1240 respectively, that have a shape distinct from braces 108 and 110. In the present embodiment, all extendable rails 1228, 1230, 1234, and 1238 move independently, allowing adaptability to unusual ceiling grid configurations. Rail guide support panel 1226 has a rim 1214 and a central speaker opening 1268 with speaker assembly attachment feature 1278 (one of three visible labeled) for fastening the speaker assembly 1248 to the rail guide support panel 1226 using fasteners 1258 (one of four visible labeled) through fastener openings 1250 (one of three visible labeled) in the base of carrier 1260. Rim 1214 has rail guide openings 1286 (one labeled of four visible of eight) that align pairwise to extendable rails 1228, 1230, 1234, and 1238.

Bottom panel 1242 has a larger central opening 1244 to accommodate the larger speaker assembly 1248. The rail guides 1216, 1222, 1224, and 1232 are mounted on the bottom side of rail guide support panel 1226 as distinct from the rail guides 904, 906, 908, and 1002, which are mounted on the top of rail guide support panel 914. Sound diffuser 1256 attaches to speaker assembly 1248.

Electronics, including a multi-tapped transformer 1218 can be seen mounted on rail guide support panel 1226. In various embodiments, respectively various electronics packages, such as amplifiers, filters, controls, etc., may be mounted on rail guide support panel 1226. Bottom panel 1242 fastener receivers 1262 (one of seven visible of eight labeled) may be seen in this view. Carrier fastener receivers 1254 extend upwards from the base of carrier 1260 to align with support fittings 1252 of speaker assembly 1248 and then fasteners 1246 (one of four labeled) extend through speaker basket rim 1264, support fittings 1252, and into carrier fastener receivers 1254 to fasten the speaker assembly 1248 to the carrier 1260.

Enclosure cover 1202 is vented using two slit vents 1270 (one of two labeled) and one vent 1204 that is part of a design on top of the enclosure cover 1202. Recessed compartment 1272 is partially on the side and top of enclosure cover 1202 and has a releasably fastenable cover 1206. Recessed compartment 1272 provides access to the transformer tap selector switch 1276, which is internal in this embodiment. Audio wires from an audio source connect to audio connector 1208 which installs in opening 1274 using washer 1210. Enclosure cover 1202 has a perimeter flange 1280 with fastener openings 1282 for receiving fasteners 1212 for connection through the rail guide support panel 1226 to the fastener receivers 1262 in bottom panel 1242.

Figure 13:
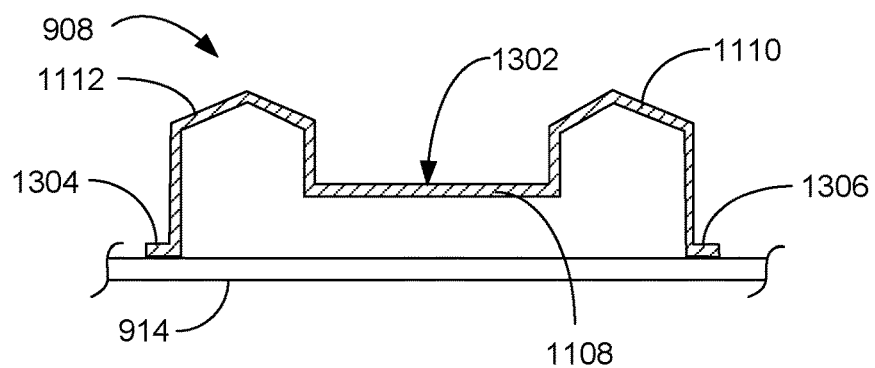
FIG. 13 is a cross sectional view along cross section AA illustrating an exemplary embodiment of the rail guides of FIGS. 10, 11, and 12, according to a preferred embodiment of the present invention.

FIG. 13 is a cross sectional view along cross section AA illustrating an exemplary embodiment of the rail guides 904, 906, 908, 1002, 1216, 1222, 1224, and 1232 of FIGS. 10, 11, and 12, according to a preferred embodiment of the present invention. Rail guide 908 is illustrated as exemplary of all the rail guides 904, 906, 1002, 1216, 1222, 1224, and 1232. Rail guide 908 has a channeled U-shaped shell lateral cross section. Central web 1108, from which opposed upright channels 1110 and 1112 extend, has a top surface 1302. Flanges 1304 and 1306 assist in connecting rail guide 908 to rail guide panel 914. The shape of the opposed upright channels 1110 and 1112 are not limitations of the present invention. For example, opposed upright channels 1110 and 1112 may be, symmetrically or asymmetrically, arcuate or faceted.

Figure 14:
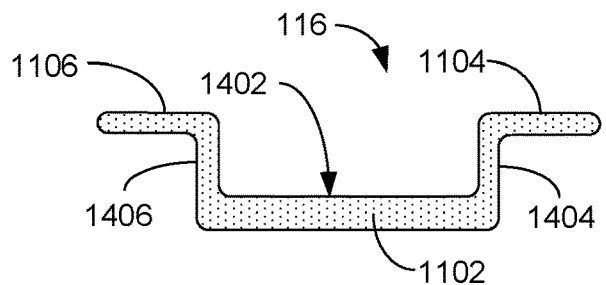
FIG. 14 is a cross sectional view along cross section AA illustrating an exemplary embodiment of the extendable rails of FIGS. 10, 11, and 12, according to a preferred embodiment of the present invention.

FIG. 14 is a cross sectional view along cross section AA illustrating an exemplary embodiment of the extendable rails 112, 114, 116, 118, 1228, 1230, 1234, and 1238 of FIGS. 1, 10, 11, and 12, according to a preferred embodiment of the present invention. Extendable rail 116 is exemplary of the extendable rails 112, 114, 118, 1228, 1230, 1234, and 1238. Extendable rail 116 has a flanged U-shaped lateral cross section in which upright sides 1406 and 1404 extend from web 1102 and lateral flanges 1106 and 1104 extend from upright sides 1406 and 1404, respectively. The shape of the lateral flanges 1106 and 1104 are not limitations of the present invention. Web 1102 has a top surface 1402. For example, lateral flanges 1106 and 1104 may be, symmetrically or asymmetrically, arcuate or faceted.

Figure 15:
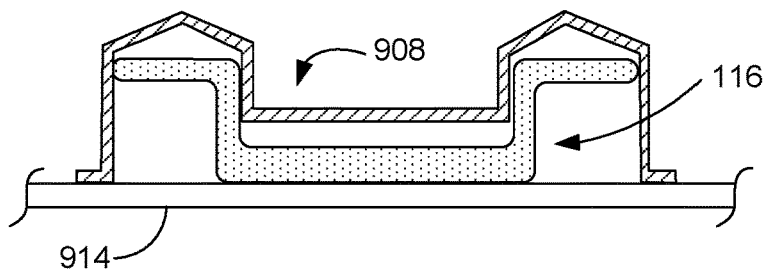
FIG. 15 is a cross sectional view along cross section AA illustrating an exemplary embodiment of the extendable rails and rail guides of FIGS. 10, 11, and 12, according to a preferred embodiment of the present invention.

FIG. 15 is a cross sectional view along cross section AA illustrating an exemplary embodiment of the extendable rails 112, 114, 116, 118, 1228, 1230, 1234, and 1238 and rail guides 904, 906, 908, 1002, 1216, 1222, 1224, and 1232 of FIGS. 1, 10, 11, and 12, according to a preferred embodiment of the present invention. Exemplary extendable rail 116 is shown slidingly engaged in exemplary rail guide 908.

Figure 16:
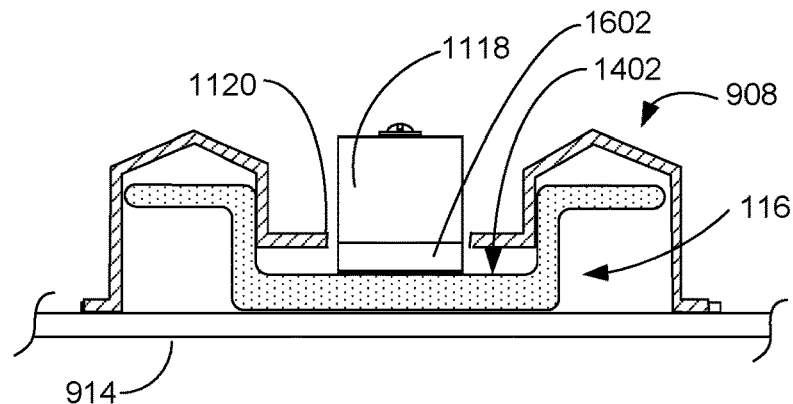
FIG. 16 is a cross sectional view along cross section BB illustrating an exemplary embodiment of the extendable rails, rail guides, and attachable reed spring of FIGS. 10, 11, and 12, according to a preferred embodiment of the present invention.

FIG. 16 is a cross sectional view along cross section BB illustrating an exemplary embodiment of the extendable rails 112, 114, 116, 118, 1228, 1230, 1234, and 1238, rail guides 904, 906, 908, 1002, 1216, 1222, 1224, and 1232, and attachable reed springs 1118 and 1220 of FIGS. 1, 10, 11, and 12, according to a preferred embodiment of the present invention. Reed spring 1118 extends through a window 1120 in central web 1108 and curves upward 1602 after frictionally engaging the top surface 1402 of web 1102. Attachable reed spring 1220 is similar to attachable reed spring 1118.

I claim:

1. An adjustable speaker support for suspended ceilings comprising:
   a. a rail guide panel, further comprising a vertically rimmed perimeter, supporting at least four rail guides interior to said perimeter;
   b. at least four extendable rails slidingly received and frictionally engaged in respective said at least four rail guides; and
   c. a bottom panel releasably attached to a bottom of said rail guide panel.

2. The support of claim 1, comprising at least four reed springs, attachable to extend through said respective at least four rail guides to frictionally engage said at least four extendable rails.

3. The support of claim 1, wherein:
   a. said at least four extendable rails each have a flanged U-shaped lateral cross section;
   b. said at least four rail guides each have a channeled U-shaped shell lateral cross section; and c. said rail guide panel comprises a perimeter rim having a plurality of rail guide openings pairwise aligned to each of said at least four rail guides.

4. The support of claim 1, wherein:
   a. said at least four rail guides are arranged in pairs extendable from opposed sides of said rail guide panel; and
   b. each extendable rail of said at least four extendable rails is coupled to a brace configured to engage a ceiling tile grid member.

5. The support of claim 4, wherein each said extendable rail of said at least four extendable rails is extendable independently of any other said extendable rail of said at least four extendable rails.

6. The support of claim 1, comprising a speaker assembly attachment feature in said rail guide panel.

7. The support of claim 1, comprising a multi-tapped transformer mounted on said rail guide panel.

8. The support of claim 1, comprising a cover supported on, and releasably attachable to, said rail guide panel.

9. The support of claim 8, comprising a compartment in said cover, said compartment providing access to a multi-tapped transformer selection switch.

10. The support of claim 1, comprising length graduations on each rail of said at least four extendable rails.

11. An adjustable speaker support for suspended ceilings comprising:
    a. a rail guide panel supporting at least four rail guides; and
    b. at least four extendable rails slidingly received and frictionally engaged in respective said at least four rail guides;
    c. wherein:
       i. said at least four extendable rails each have a flanged U-shaped lateral cross section;
       ii. said at least four rail guides each have a channeled U-shaped shell lateral cross section; and
       iii. said rail guide panel comprises a perimeter rim having a plurality of rail guide openings pairwise aligned to each said rail guide of said at least four rail guides.

12. The support of claim 11, wherein:
    a. said at least four rail guides are arranged in pairs extendable from opposed sides of said rail guide panel; and
    b. each extendable rail of said at least four extendable rails is coupled to a brace configured to engage a ceiling tile grid member.

13. The support of claim 11, wherein each said extendable rail of said at least four extendable rails is extendable independently of any other said extendable rail of said at least four extendable rails.

14. The support of claim 11, comprising at least two of:
    a. a speaker assembly attachment feature in said rail guide panel;
    b. a multi-tapped transformer mounted on said rail guide panel; and
    c. a cover supported on, and releasably attachable to, said rail guide panel.

15. The support of claim 14, comprising a compartment in said cover, said compartment providing access to a multi-tapped transformer selection switch.

16. The support of claim 11, comprising a bottom panel releasably attached to a bottom of said rail guide panel.

17. The support of claim 11, comprising at least four reed springs, attachable to extend through said respective at least four rail guides to frictionally engage said at least four extendable rails.

18. An adjustable speaker support for suspended ceilings comprising:
    a. a rail guide panel supporting at least four rail guides; and
    b. at least four extendable rails slidingly received and frictionally engaged in respective said at least four rail guides; and
    c. wherein:
       i. said at least four extendable rails each have a flanged U-shaped lateral cross section;
       ii. said at least four rail guides each have a channeled U-shaped shell lateral cross section;
       iii. said rail guide panel comprises a perimeter rim having a plurality of rail guide openings pairwise aligned to each said rail guide of said at least four rail guides;
       iv. said at least four rail guides are arranged in pairs extendable from opposed sides of said rail guide panel; and
       v. each extendable rail of said at least four extendable rails is coupled to a brace configured to engage a ceiling tile grid member.

19. The support of claim 18, wherein each said extendable rail of said at least four extendable rails is extendable independently of any other said extendable rail of said at least four extendable rails.

20. The support of claim 18, comprising at least two of:
    a. a speaker assembly attachment feature in said rail guide panel;
    b. a multi-tapped transformer mounted on said rail guide panel;
    c. a cover supported on, and releasably attachable to, said rail guide panel, further comprising a compartment in said cover, said compartment providing access to a multi-tapped transformer selection switch;
    d. a bottom panel releasably attached to a bottom of said rail guide panel,
    e. at least four reed springs, attachable to extend through said respective at least four rail guides to frictionally engage said at least four extendable rails.

* * * * *